(12) United States Patent
Balasubramanian

(10) Patent No.: US 10,079,657 B2
(45) Date of Patent: Sep. 18, 2018

(54) TECHNIQUES FOR HARQ RETRANSMISSION SKIPPING

(71) Applicant: QUALCOMM Incorporated, San Diego, CA (US)

(72) Inventor: Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 15/371,948

(22) Filed: Dec. 7, 2016

(65) Prior Publication Data

US 2017/0180085 A1 Jun. 22, 2017

Related U.S. Application Data

(60) Provisional application No. 62/268,354, filed on Dec. 16, 2015.

(51) Int. Cl.
*H04L 1/18* (2006.01)
*H04W 52/02* (2009.01)
(Continued)

(52) U.S. Cl.
CPC .......... *H04L 1/1812* (2013.01); *H04L 1/1858* (2013.01); *H04L 1/1867* (2013.01); *H04L 1/1887* (2013.01); *H04L 5/0055* (2013.01); *H04W 52/0235* (2013.01); *H04W 72/14* (2013.01); *H04W 76/10* (2018.02); (Continued)

(58) Field of Classification Search
CPC ... H04L 1/1812; H04L 1/1858; H04L 1/1867; H04L 1/1887; H04L 5/0055; H04L 69/323; H04W 76/28; H04W 76/10; H04W 52/0235; H04W 72/14; H04W 88/02; Y02D 70/24; Y02D 70/26; Y02D 70/142; Y02D 70/00; Y02D 70/1262; Y02D 70/1242; Y02D 70/23
See application file for complete search history.

(56) References Cited

U.S. PATENT DOCUMENTS

| 8,867,455 | B2 | 10/2014 | Sambhwani et al. |
| 9,161,371 | B2 | 10/2015 | Ehsan et al. |
| 9,203,566 | B2 | 12/2015 | Terry et al. |
| 2009/0010173 | A1 | 1/2009 | Kim et al. |

(Continued)

OTHER PUBLICATIONS

International Search Report and Written Opinion issued in International Patent Application No. PCT/US2016/065614 dated Mar. 6, 2017 (12 pages).

*Primary Examiner* — Duc C Ho
(74) *Attorney, Agent, or Firm* — Arent Fox LLP

(57) ABSTRACT

The disclosure provides for selectively utilizing an inactive mode for saving power during wireless communications. A user equipment (UE) may transmit a first data packet for a first bearer using a Hybrid Automatic Repeat request (HARQ) process to a base station on a first channel. The UE may receive at least two acknowledgments, for the HARQ process on a second channel different than the first channel indicating that the first data packet was successfully received by the base station. The UE may determine whether a second data packet is communicated for the first bearer or a second bearer. The UE may also determine, based at least in part on the determination of whether the second data packet is communicated, whether to enter into an inactive mode in which at least the second channel is not decoded.

30 Claims, 11 Drawing Sheets

(51) Int. Cl.
*H04L 5/00* (2006.01)
*H04W 72/14* (2009.01)
*H04W 76/28* (2018.01)
*H04W 76/10* (2018.01)
*H04L 29/08* (2006.01)
*H04W 88/02* (2009.01)

(52) U.S. Cl.
CPC ........... *H04W 76/28* (2018.02); *H04L 69/323* (2013.01); *H04W 88/02* (2013.01); *Y02D 70/00* (2018.01); *Y02D 70/1242* (2018.01); *Y02D 70/1262* (2018.01); *Y02D 70/142* (2018.01); *Y02D 70/23* (2018.01); *Y02D 70/24* (2018.01); *Y02D 70/26* (2018.01)

(56) References Cited

U.S. PATENT DOCUMENTS

| | | |
|---|---|---|
| 2011/0292854 A1* | 12/2011 | Terry ..................... H04L 5/001 370/311 |
| 2014/0003364 A1 | 1/2014 | Ramachandran et al. |
| 2014/0036808 A1* | 2/2014 | Pelletier ................ H04W 72/14 370/329 |
| 2014/0219151 A1 | 8/2014 | Damji et al. |
| 2014/0254538 A1 | 9/2014 | Park et al. |
| 2015/0124671 A1* | 5/2015 | Tabet ................ H04W 52/0216 370/311 |
| 2016/0044708 A1 | 2/2016 | Lin et al. |
| 2017/0163387 A1* | 6/2017 | Tabet ................... H04L 1/1854 |

\* cited by examiner

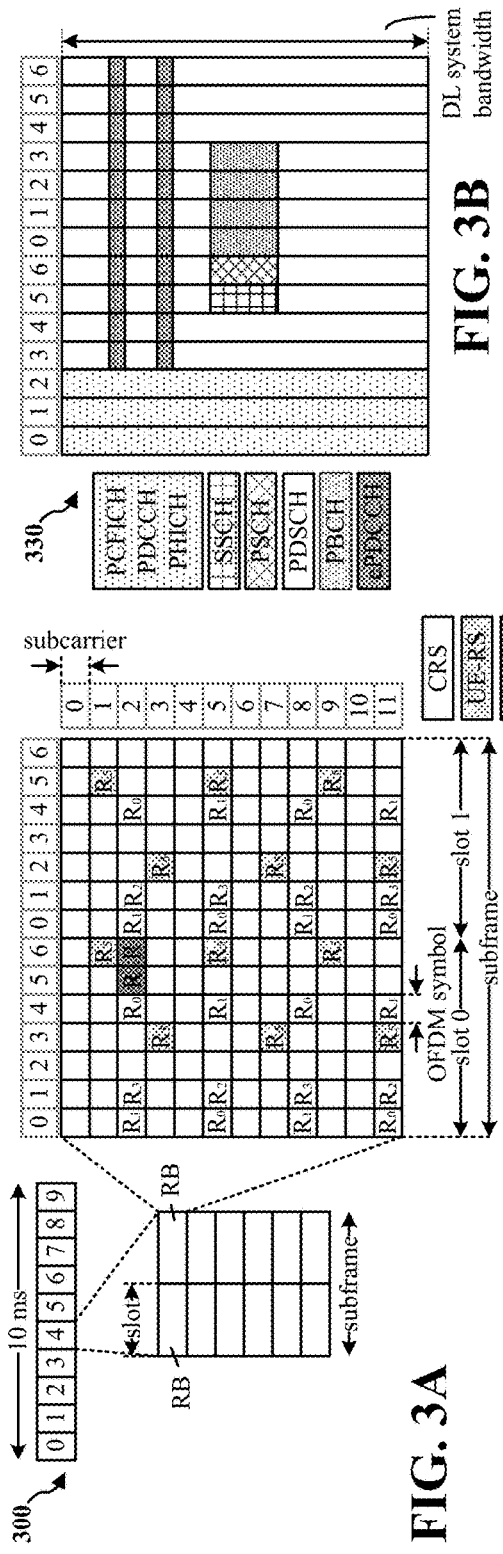
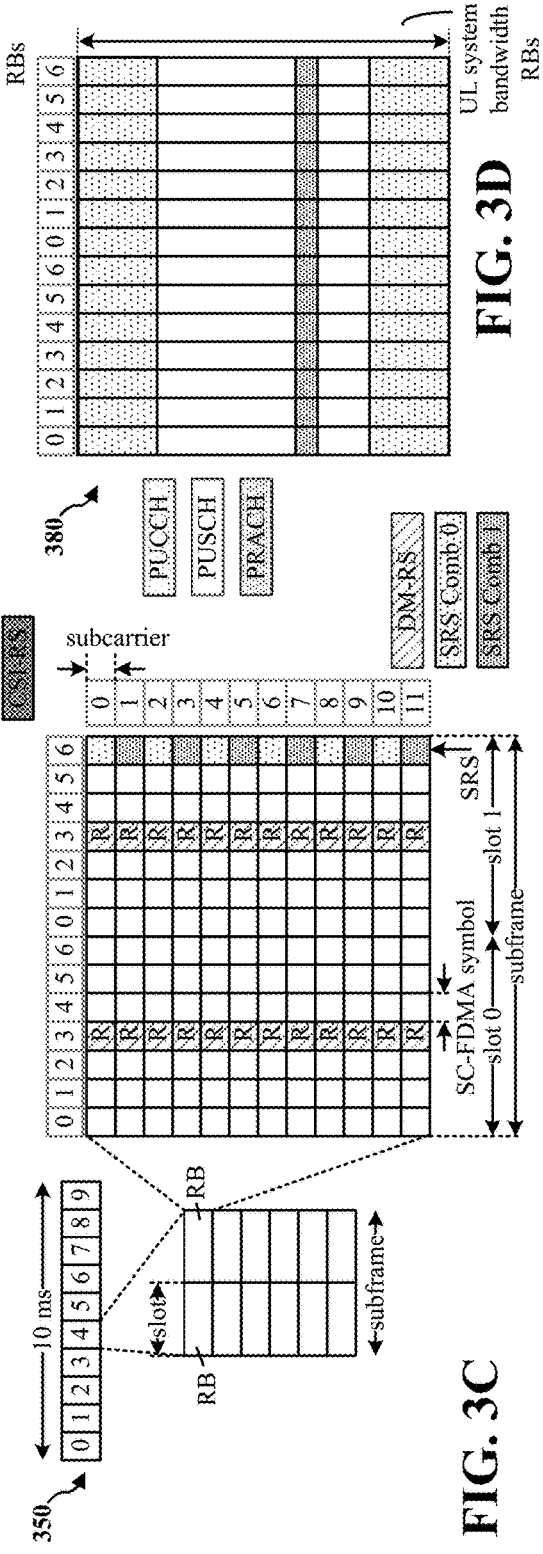
FIG. 3A
FIG. 3B
FIG. 3C
FIG. 3D

TECHNIQUES FOR HARQ RETRANSMISSION SKIPPING

CLAIM OF PRIORITY UNDER 35 U.S.C. § 119

The present Application for Patent claims priority to Provisional Application No. 62/268,354 entitled "TECHNIQUES FOR HARQ RETRANSMISSION SKIPPING" filed Dec. 16, 2015, which is assigned to the assignee hereof, and incorporated herein by reference in its entirety.

BACKGROUND

Field

The present disclosure relates generally to communication systems, and more particularly, to techniques for hybrid automatic repeat request (HARQ) retransmissions in wireless communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Various telecommunications standards employ an HARQ protocol for repeating transmissions at a physical layer. While a HARQ protocol may reduce the time needed to correct transmission errors, the HARQ protocol may also consume battery power of a user equipment monitoring for repeated acknowledgments of data packets.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Some wireless communications may include sending (e.g., such as a voice over internet protocol (VoIP) call periodically sending) data packets and waiting for an indication of whether the data packets are correctly received. In some cases (e.g., a voice over LTE (VoLTE) call), the indication may be received before the next data packet is ready for transmission. When the indication acknowledges the data packet was correctly received, there may be no need to send a retransmission. Accordingly, it may be beneficial for the transmitting device to enter an inactive mode to save power because the transmitting device may not expect to send or receive any other data packets.

The disclosure provides for selectively utilizing an inactive mode for saving power during wireless communications. A user equipment (UE) may transmit a first data packet for a first bearer using a Hybrid Automatic Repeat request (HARQ) process to a base station on a first channel. The UE may receive at least two acknowledgments, for the HARQ process on a second channel different than the first channel indicating that the first data packet was successfully received by the base station. The UE may determine whether a second data packet is communicated for a second bearer. The UE may also determine, based at least in part on the determination of whether the second data packet is communicated for the second bearer to the UE, whether to enter into an inactive mode in which no data packets are decoded at least the second channel is not decoded. In an aspect, the present disclosure improves performance of a UE by effectively utilizing the inactive mode without missing transmissions on other bearers. In an aspect of the disclosure, a method, a computer-readable medium, and an apparatus are provided.

In an aspect, the disclosure provides a method of wireless communications by a UE. The method may include transmitting a first data packet for a first bearer using a HARQ process to a base station on a first channel. The method may further include receiving at least two acknowledgments, for the HARQ process on a second channel different than the first channel indicating that the first data packet was successfully received by the base station. The method may also include determining whether a second data packet is communicated for the first bearer or a second bearer. The method may additionally include determining, based at least in part on the determination of whether the second data packet is communicated, whether to enter into an inactive mode in which at least the second channel is not decoded.

In another aspect, the disclosure provides a UE for wireless communications. The UE may include a transceiver, a memory, and a processor communicatively coupled to the transceiver and the memory. The processor may be configured to transmit a first data packet for a first bearer using a HARQ process to a base station on a first channel. The processor may further be configured to receive at least two acknowledgments, for the HARQ process on a second channel different than the first channel indicating that the first data packet was successfully received by the base station. The processor may also be configured to determine whether a second data packet is communicated for the first bearer or a second bearer. The processor may additionally be configured to determine, based at least in part on the determination of whether the second data packet is communicated, whether to enter into an inactive mode in which at least the second channel is not decoded.

In another aspect, the disclosure provides another UE for wireless communications. The UE may include means for transmitting a first data packet for a first bearer using a HARQ process to a base station on a first channel. The UE may further include means for receiving at least two acknowledgments, for the HARQ process on a second channel different than the first channel indicating that the first data packet was successfully received by the base station. The UE may also include means for determining whether a second data packet is communicated for the first bearer or a second bearer. The UE may additionally include means for determining, based at least in part on the determination of whether the second data packet is communicated, whether to enter into an inactive mode in which at least the second channel is not decoded.

In another aspect, the disclosure provides a computer readable medium storing computer executable code. The computer readable medium may include code to transmit a first data packet for a first bearer using a HARQ process to a base station on a first channel. The computer readable medium may include code to receive at least two acknowledgments, for the HARQ process on a second channel different than the first channel indicating that the first data packet was successfully received by the base station. The computer readable medium may include code to determine whether a second data packet is communicated for the first bearer or a second bearer. The computer readable medium may include code to determine, based at least in part on the determination of whether the second data packet is communicated, whether to enter into an inactive mode in which at least the second channel is not decoded.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 3A, 3B, 3C, and 3D are diagrams illustrating LTE examples of a DL frame structure, DL channels within the DL frame structure, an UL frame structure, and UL channels within the UL frame structure, respectively.

DETAILED DESCRIPTION

Figure 1:
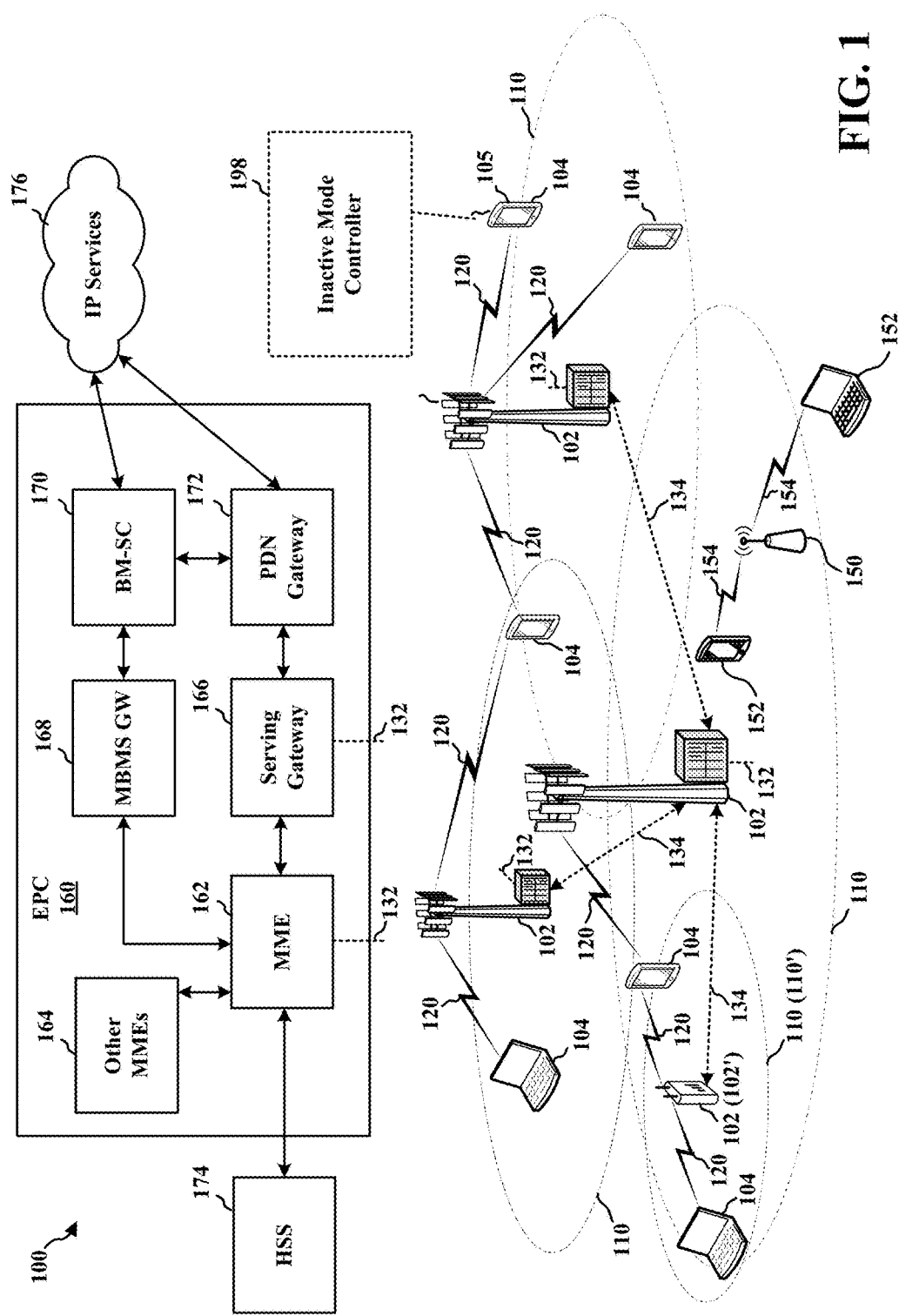
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system 100 and an access network. The wireless communications system 100 (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells. As shown, a UE 104 may include a housing 105.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MB SFN) area broadcasting a particular service, and may be responsible for session management (start/stop) and for collecting eMBMS related charging information.

The base station may also be referred to as a Node B, an evolved node B (eNB) an access point, a base transceiver station, a radio base station, a radio transceiver, a transceiver function, a basic service set (BSS), an extended service set (ESS), or some other suitable terminology. The eNB 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured with an inactive mode controller 198. The inactive mode controller 198 may selectively place the UE 104 into an inactive mode when the UE is transmitting data packets using a first bearer based at least in part on whether data packets are transmitted for a second bearer. As used herein, the term "inactive mode" refers to a state in which the UE 104 does not decode one or more channels of a received signal. For example, the UE 104 may not decode a physical hybrid automatic repeat request indicator channel (PHICH) while in the inactive mode. The UE 104 may also not decode a physical downlink common control channel (PDCCH) while in the inactive mode. In an aspect, the inactive mode may reduce power consumption of the UE 104 by allowing the UE 104 to put one or more components (e.g., a receiver) into a sleep state during the inactive mode. Accordingly, the inactive mode may be referred to as a sleep mode or a low power mode. Radio bearers are channels offered by Layer 2 to higher layers for the transfer of either user or control data. For example, a VoLTE call may be carried on a bearer and have specified quality of service (QoS) parameters. A mobile device may concurrently connect to other services, each of which may be carried on a separate bearer.

Figure 2:
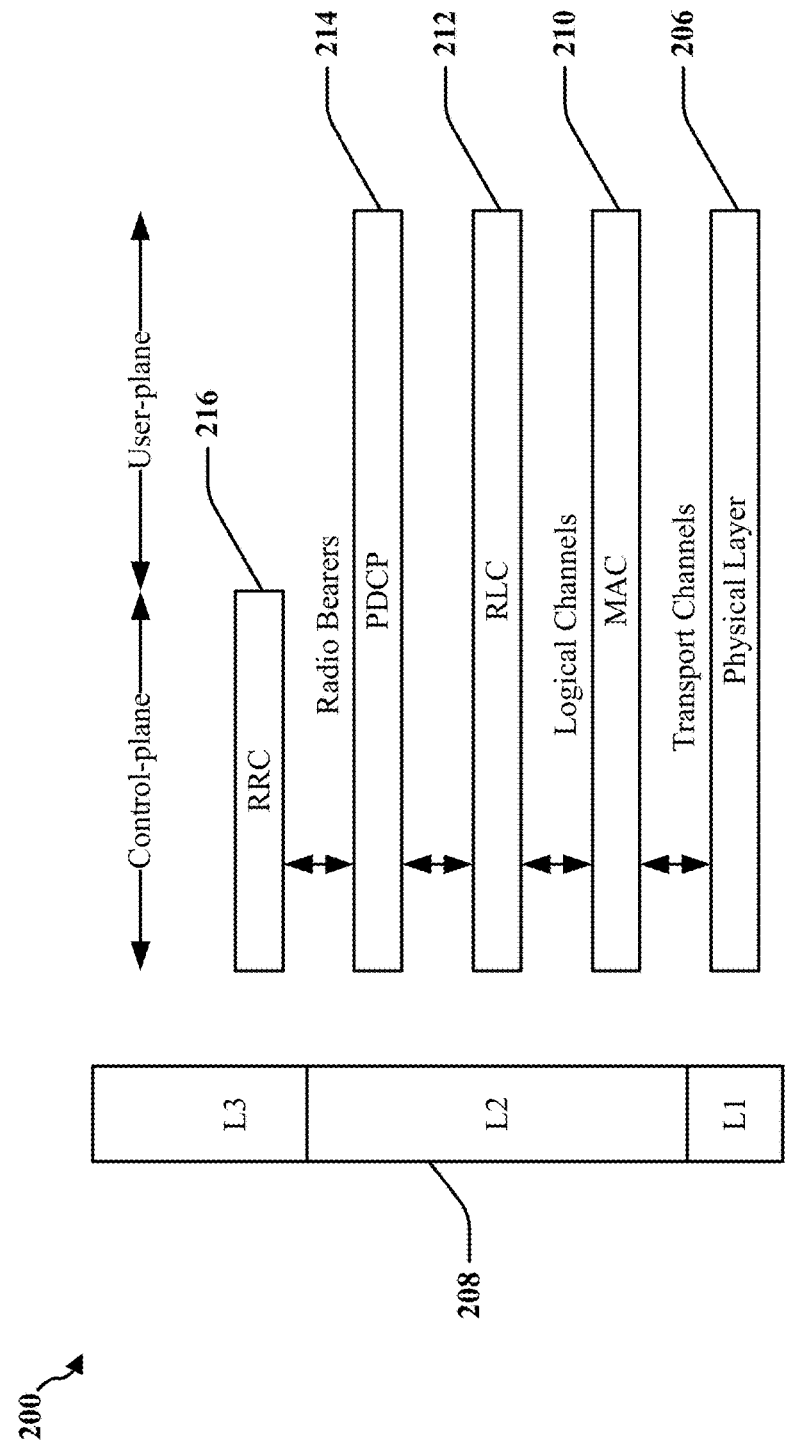
FIG. 2 is a diagram illustrating an example of a radio protocol architecture for the user and control planes in accordance with an aspect of the present disclosure.

FIG. 2 is a diagram 200 illustrating an example of a radio protocol architecture for the user and control planes in LTE. The radio protocol architecture may be used by a UE, such UE 104 (FIG. 1) and an eNB such as eNB 102. The radio protocol architecture includes three layers: Layer 1, Layer 2, and Layer 3. Layer 1 (L1 layer) is the lowest layer and implements various physical layer signal processing functions. The L1 layer will be referred to herein as the physical layer 206. Layer 2 (L2 layer) 208 is above the physical layer 206 and is responsible for the link between the UE and eNB over the physical layer 206.

In the user plane, the L2 layer 208 includes a media access control (MAC) sublayer 210, a radio link control (RLC) sublayer 212, and a packet data convergence protocol (PDCP) 214 sublayer, which are terminated at the eNB on the network side. Although not shown, the UE may have several upper layers above the L2 layer 208 including a network layer (e.g., IP layer) that is terminated at the PDN gateway 172 on the network side, and an application layer that is terminated at the other end of the connection (e.g., far end UE, server, etc.).

The PDCP sublayer 214 provides multiplexing between different radio bearers and logical channels. The PDCP sublayer 214 also provides header compression for upper layer data packets to reduce radio transmission overhead, security by ciphering the data packets, and handover support for UEs between eNBs. The RLC sublayer 212 provides segmentation and reassembly of upper layer data packets, retransmission of lost data packets, and reordering of data packets to compensate for out-of-order reception due to hybrid automatic repeat request (HARQ). The MAC sublayer 210 provides multiplexing between logical and transport channels. The MAC sublayer 210 is also responsible for allocating the various radio resources (e.g., resource blocks) in one cell among the UEs. The MAC sublayer 210 is also responsible for HARQ operations. The inactive mode controller 198 may operate between the physical layer 206 and L2 layer 208. In an aspect, the inactive mode controller 198 may control physical layer performance (e.g., reception) of physical channels based on the status of radio bearers as determined at the PDCP sub-layer 214.

In the control plane, the radio protocol architecture for the UE and eNB is substantially the same for the physical layer 206 and the L2 layer 208 with the exception that there is no header compression function for the control plane. The control plane also includes a radio resource control (RRC) sublayer 216 in Layer 3 (L3 layer). The RRC sublayer 216 is responsible for obtaining radio resources (i.e., radio bearers) and for configuring the lower layers using RRC signaling between the eNB and the UE.

FIG. 3A is a diagram 300 illustrating an example of a DL frame structure in LTE. FIG. 3B is a diagram 330 illustrating an example of channels within the DL frame structure in LTE. FIG. 3C is a diagram 350 illustrating an example of an UL frame structure in LTE. FIG. 3D is a diagram 380 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 3A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 3A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 3B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 3, or 3 symbols (FIG. 3B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 3B shows two RB pairs, each subset including one RB pair). When the UE 104 is operating in the inactive mode, the UE 104 may not decode the PDCCH or ePDCCH in one or more sub-frames. The physical hybrid automatic repeat request (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). In an aspect, the inactive mode controller 198 may place the UE 104 in the inactive mode when the UE 104 receives two ACKs for the same HARQ indicator on the PHICH. When the UE 104 is operating in the inactive mode, the UE 104 may not decode the PHICH in one or more sub-frames. The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. In an aspect, the inactive mode may be disabled when the UE 104 is configured for SRS transmission. FIG. 3D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI. In an aspect, a data packet for a VoLTE call may be carried by the PUSCH.

Figure 4:
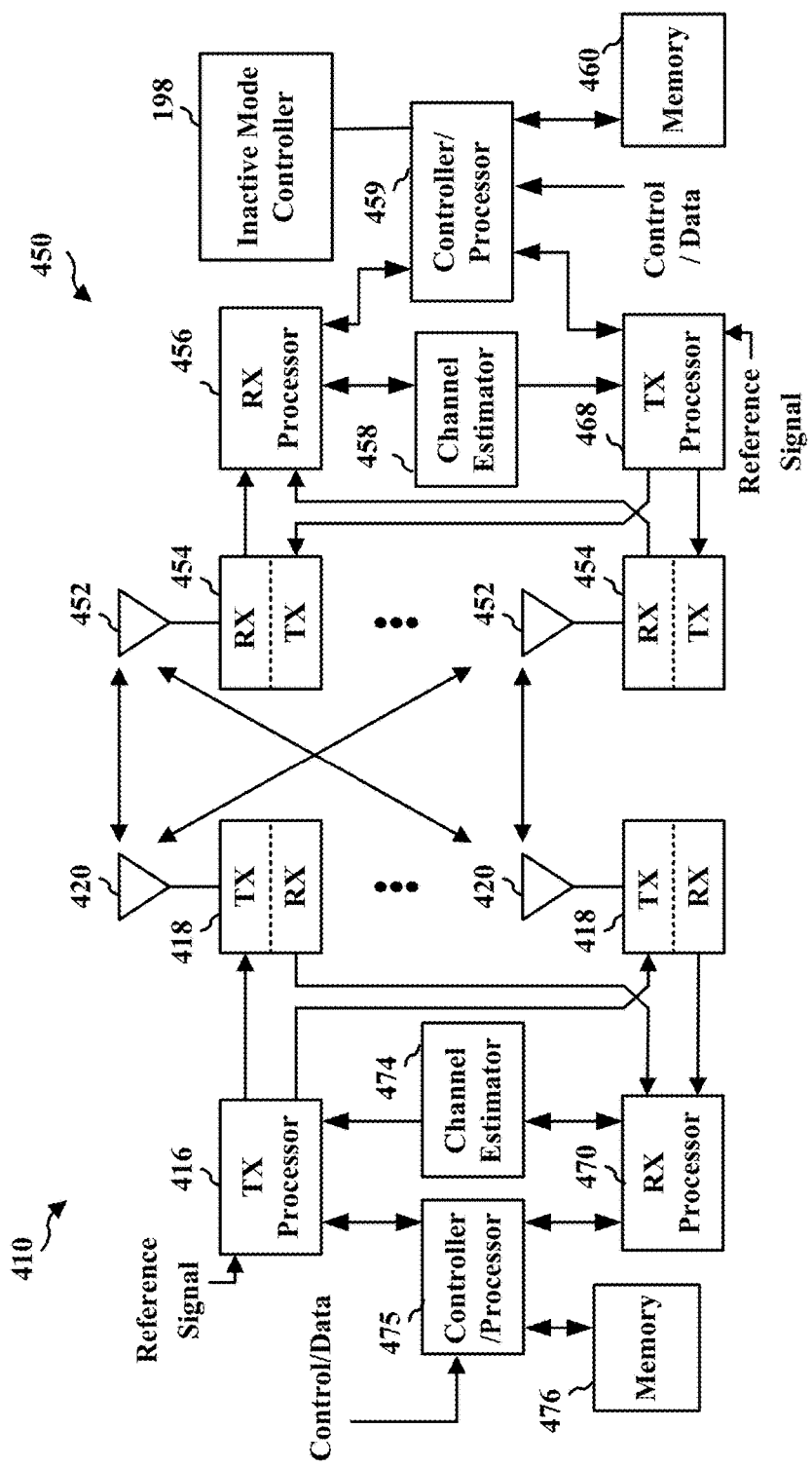
FIG. 4 is a diagram illustrating an example of an evolved Node B (eNB) and user equipment (UE) in an access network.

FIG. 4 is a block diagram of an eNB 410 in communication with a UE 450 in an access network. In the DL, IP packets from the EPC 160 may be provided to a controller/processor 475. The controller/processor 475 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 475 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 410. These soft decisions may be based on channel estimates computed by the channel estimator 458. The soft decisions are then decoded and deinterleaved to recover the data and control signals that were originally transmitted by the eNB 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the eNB 410, the controller/processor 459 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the eNB 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the eNB 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

In an aspect, the UE 450 may also include the inactive mode controller 198 (FIG. 1). The inactive mode controller 198 may control the UE 450 to reduce or ignore HARQ operations in order to reduce power consumption. For example, when the UE 450 is in a VoLTE call, the UE may periodically transmit and receive voice packets, but may have no other data packets to transmit. A VoLTE call may be configured with a connected mode discontinuous reception (CDRX) period of 40 ms, in which two voice packets are combined into a single data transmission every 40 ms. According to a VoLTE timeline, when the UE has a voice packet to transmit, the UE may wake up to receive a grant, transmit the voice packet, and wait for a HARQ acknowledgement. A 20 ms CDRX period may also be used for a VoLTE call in which the UE transmits a single voice packet every 20 ms. Although HARQ protocols typically allow up to four retransmissions of a data packet during the CDRX period, the eNB 400 may successfully receive the data packet on the first transmission and send an ACK. In an aspect, the UE 450 may save power by entering an inactive mode in which the UE does not decode received signals until the next voice packet transmission is expected in the next CDRX period. In particular, the UE 450 may skip decoding one or more expected ACK/NACKs on the PHICH.

In an aspect, the inactive mode may be selectively utilized depending on conditions other than the VoLTE call. For example, if the UE 450 is communicating in a second call on a second bearer, the inactive mode controller 198 may prevent the UE 450 from entering the inactive mode. Even if a second bearer is configured, however, the UE 450 may enter the inactive mode when the second call is inactive. For example, the inactive mode controller 198 may use an inactivity timer to determine when the second call is inactive and activate the inactive mode when the inactivity timer expires. The inactive mode controller 198 may run an inactivity timer for each bearer at the PDCP layer and enable the inactive mode when the inactivity timer for each bearer other than the first bearer (e.g., the VoLTE call) is inactive. The inactive mode controller 198 may disable the inactive mode from the PDCP layer whenever there is traffic (either uplink or downlink) on another bearer.

In another aspect, the inactive mode may be disabled based on physical layer configuration. For example, if the physical layer is configured for transmission of sounding reference signals (SRS), transmission using transmission time interval bundling (TTI-B), transmission of channel state information (CSI), buffer status report (BSR) or reception of multimedia broadcast multicast service (MBMS) signals, the inactive mode may be disabled. The inactive mode may also be disabled when the UE is not configured for CDRX.

Figure 5:
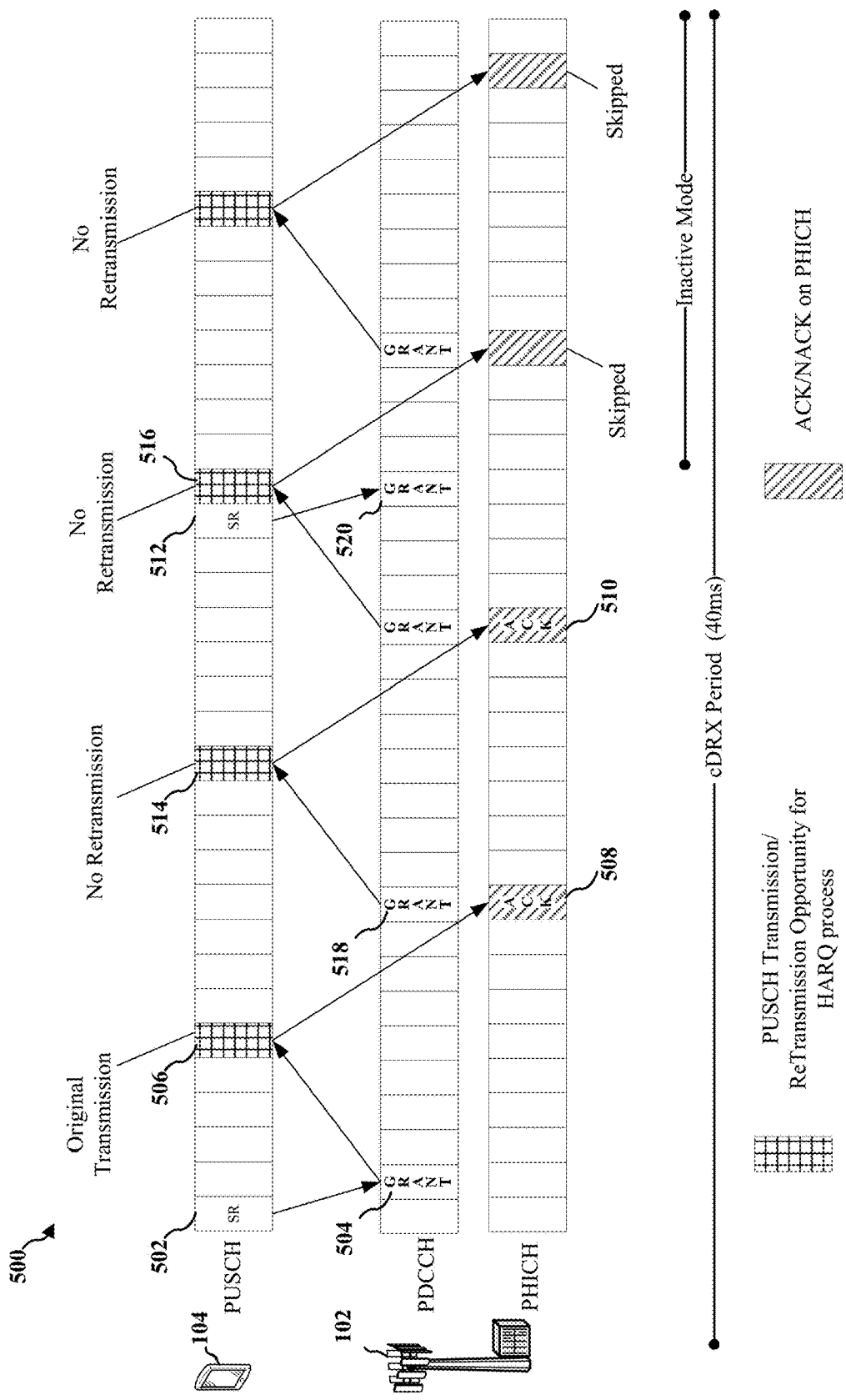
FIG. 5 is a diagram illustrating an example of transmission timing for a HARQ process.

FIG. 5 is a diagram 500 illustrating an example of transmission timing for a HARQ process. Each box or section shown in the PUSCH, the PDCCH, and the PHICH may represent a 1 millisecond (ms) sub-frame. In an aspect, the UE may be in a VoLTE call on a first bearer and other bearers may be inactive, so only a single HARQ process may be active. The UE (e.g., UE 104) may transmit a scheduling request (SR) 502 on the PUSCH to inform the eNB (e.g., eNB 102) that the UE has data to transmit (e.g., a voice packet for VoLTE). The eNB may schedule the UE by transmitting a grant 504 on the PDCCH. The grant may indicate a HARQ process identifier for the UE. The UE 104 may transmit the voice packet 506 on the PUSCH in a sub-frame on resources indicated by the grant (e.g., 4 ms after the grant). The eNB 102 may transmit an ACK/NACK 508 on the PHICH indicating whether the voice packet was successfully received by the eNB. As illustrated, the eNB 102 may use the PHICH to transmit an ACK 508 indicating the reception status of the original transmission of the voice packet 506 four sub-frames after the original transmission. In an aspect, the eNB may continue to indicate the reception status of the HARQ process after transmitting the first ACK 508. For example, the eNB may transmit a second ACK 510 eight sub-frames after the first ACK 508 even if no retransmission occurs in sub-frame 514. If no retransmission occurs, the reception status for the HARQ process will generally remain the same as the previous indication on PHICH.

In an aspect, an eNB may transmit a first ACK 508 even though the packet was not successfully received. This first ACK 508 may be referred to as a suspend ACK. A suspend ACK may cause the UE to refrain from retransmitting the voice packet in a next available sub-frame for the HARQ process. For example, the UE 104 may not perform a retransmission in sub-frame 514 (4 sub-frames after the ACK). This suspension may allow the eNB 102 to schedule another UE to transmit in the same sub-frame using the resources that would otherwise be used by the UE 104. If the UE 104 later receives a NACK on the PHICH (e.g., if the second ACK 510 were a NACK instead), the UE 104 can then retransmit the voice packet (e.g., in sub-frame 516). In order to avoid entering the inactive mode upon receiving a suspend ACK, the UE may wait to receive a second ACK 510 before entering the inactive mode. An eNB is unlikely to send a suspend ACK as a second ACK 510 for a HARQ process.

As illustrated in FIG. 5, the eNB may also transmit a grant 518 on the PDCCH in the same sub-frame as the ACK/NACK 508 on the PHICH. In an aspect, the eNB 102 may provide a grant for each sub-frame in which the UE is to perform an uplink transmission. The grant 518 may indicate whether the UE 104 should retransmit the original transmission. For example, the grant 518 may indicate which resources to use in a sub-frame four sub-frames after a NACK is received.

The UE 104 may determine whether to enter the inactive mode in response to receiving the second ACK 510. The UE 104 may, however, need to decode the PDCCH in order to determine a grant 520 for transmitting another voice packet. Accordingly, the UE 104 may refrain from entering the inactive mode when the UE 104 has transmitted a scheduling request 512 until a corresponding grant 520 is received. That is, the UE 104 may be aware that a second data packet is to be transmitted on the first bearer and avoid entering the inactive mode. The UE 104 may also leave the inactive mode when transmitting a scheduling request in order to decode a grant on the PDCCH.

Figure 6:
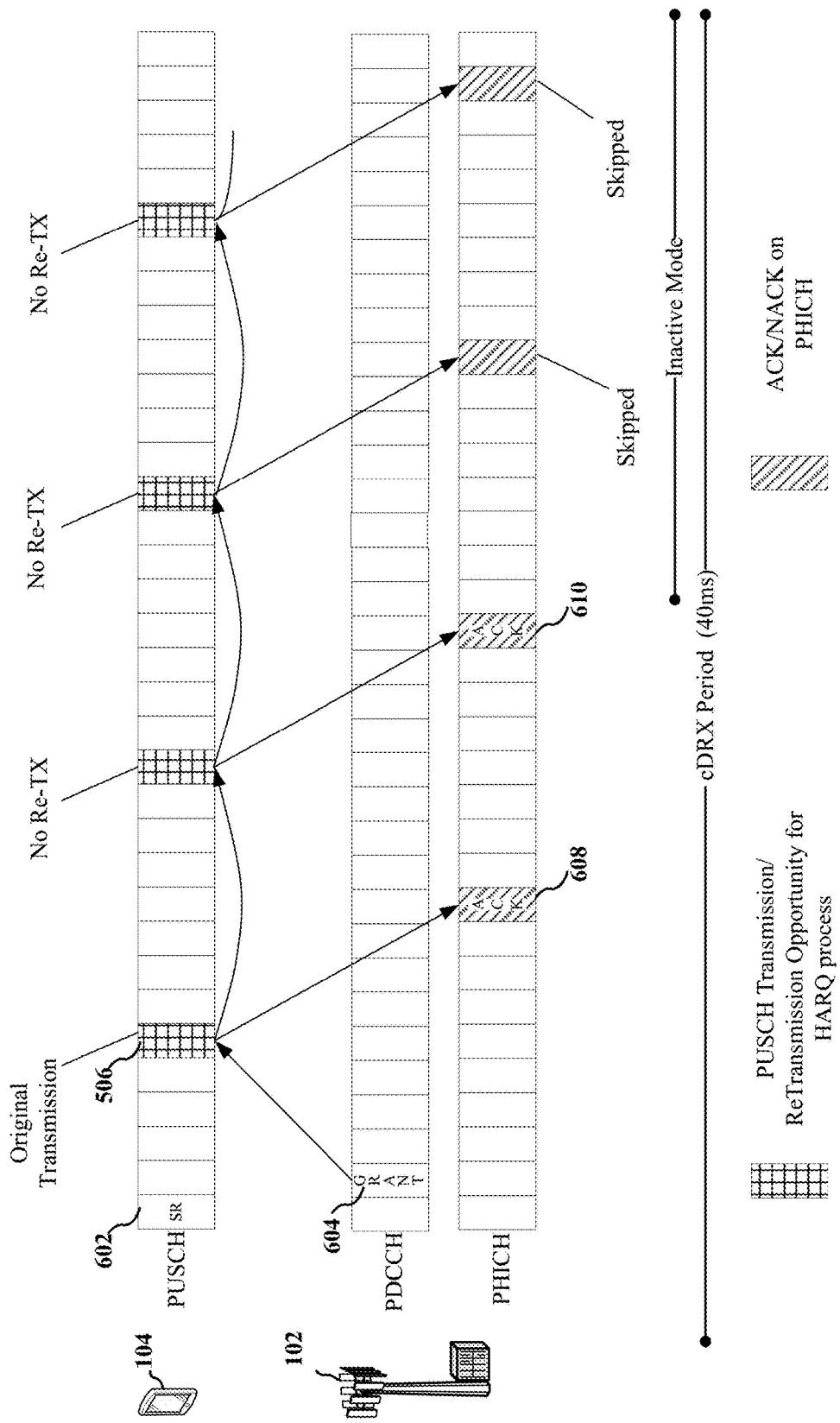
FIG. 6 is a diagram illustrating an example of transmission timing for a HARQ process using semi-persistent scheduling.

FIG. 6 is a diagram illustrating an example of transmission timing for a HARQ process using semi-persistent scheduling. The transmissions in FIG. 6 may be similar to the transmissions in FIG. 5, except the eNB 102 may provide the UE 104 with a semi-persistent grant 604 in response to a scheduling request 602. For example, the eNB 102 may indicate that the UE 104 may use certain resources for a bearer on a periodic basis. For example, the eNB 102 may use the semi-persistent grant 604 to indicate that the UE 104 may use the same resources for transmitting/retransmitting voice packets in a HARQ process in every fourth sub-frame. Accordingly, the UE 104 may not need to transmit a scheduling request for transmitting a retransmission of the first voice packet or for transmitting a second voice packet. Similarly, the UE 104 may not need to decode the PDCCH to obtain a grant for the second voice packet. The ACK 608 may be similar to the ACK 508 and may be a suspend ACK. The second ACK 610, however, is unlikely to be a suspend ACK. Therefore, the UE 104 may enter the inactive mode upon (e.g., immediately upon) receiving a second ACK 610. The UE 104 may also remain in the inactive mode until the sub-frame for transmitting the next data packet.

Figure 7:
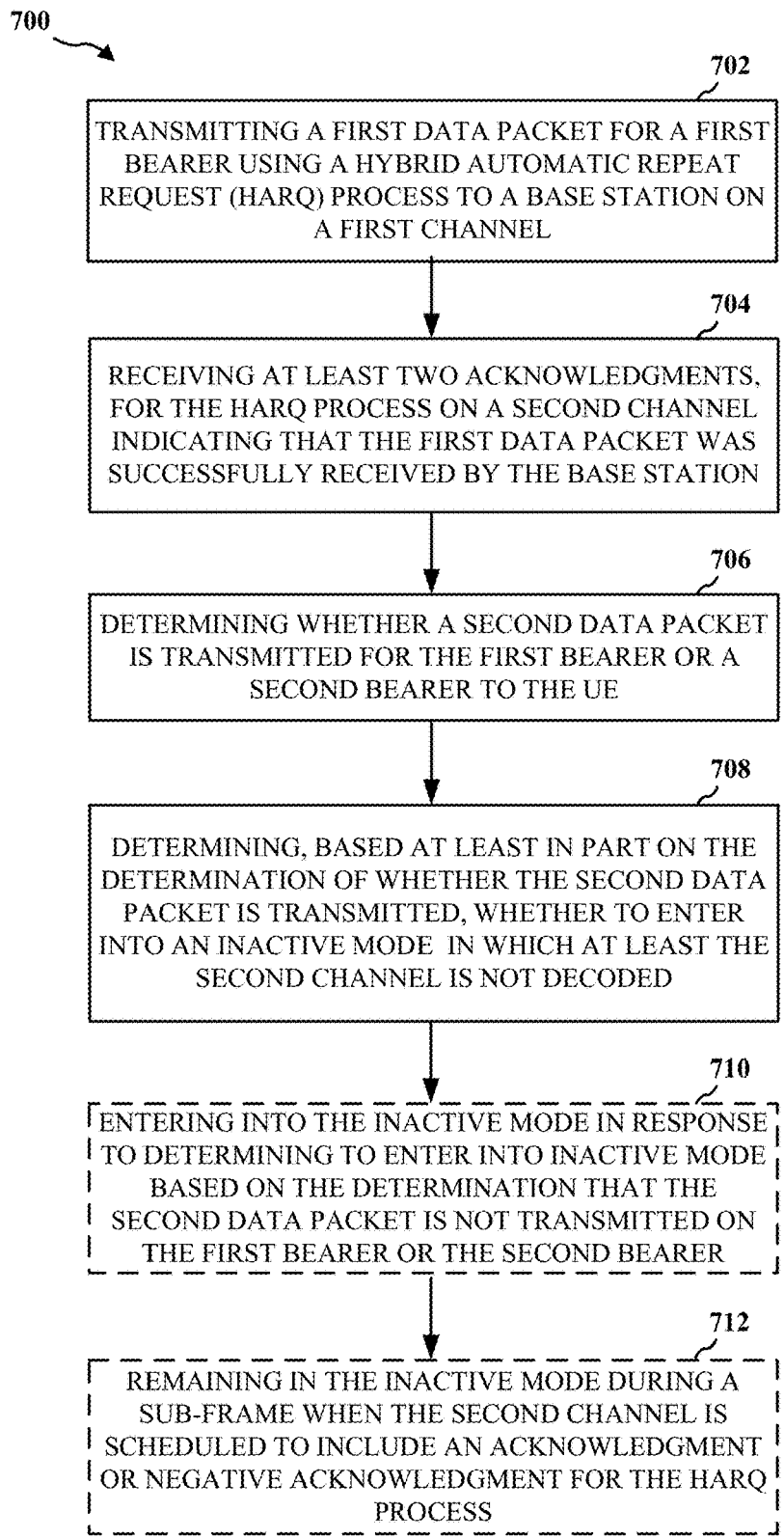
FIG. 7 is a flowchart of a method of wireless communication.

FIG. 7 is a flowchart of a method 700 of wireless communication. The method may be performed by a UE (e.g., the UE 104, UE 450, the apparatus 902/902').

At block 702, the method 700 may include transmitting a first data packet for a first bearer using a HARQ process to a base station on a first channel. In an aspect, for example, the UE 450 may transmit the first data packet via, for example, TX processor 468 and transmitters 454TX. In an aspect, the first data packet may be a voice packet for a VoLTE call. The VoLTE call may periodically generate a data packet carrying the voice packet, for example, every 20, 40, or 60 ms. The voice packet may be generated by a vocoder based on input from a microphone. The first data packet may be transmitted on the PUSCH channel based on a received grant. For example, the UE 104 may receive the grant in response to a scheduling request.

At block 704, the method 700 may include receiving at least two acknowledgments, for the HARQ process on a second channel different than the first channel indicating that the first data packet was successfully received by the base station. In an aspect, for example, the UE 450 may receive the at least two acknowledgments for the HARQ process via the receivers 454RX and the receive processor 456. Receiving the at least two acknowledgments may include decoding the PHICH. For example, the UE 104 may decode the PHICH four sub-frames after transmitting the first data packet. The UE 104 may again decode the PHICH eight sub-frames after transmitting the first data packet, or four sub-frames after transmitting a retransmission of the first data packet. Each of the acknowledgments may be an ACK on the PHICH. In an aspect, the first ACK may be a suspend ACK, but the UE 104 may assume that the reception of two consecutive ACKs for the same HARQ process actually indicates that the first data packet was successfully received by the base station. Receiving two ACKs may also provide confidence that first ACK was correctly received and was not transmitted as a NACK and erroneously received.

At block 706, the method 700 may include determining whether a second data packet is transmitted for the first bearer or a second bearer. In an aspect, for example, the controller/processor 459 may determine whether a second data packet is transmitted. For example, the controller/processor 459 may operate at the PDCP layer to determine whether a buffer associated with the second bearer has any data for the uplink or downlink. In an aspect, the controller/processor 459 may maintain an inactivity timer associated with each bearer. For example, the inactivity timer may have a duration that is a multiple of a CDRX period (e.g., 80 ms, 120 ms, 160 ms, or 200 ms). The inactivity timer may be reset whenever a data packet is transmitted or received for a bearer. The controller/processor 459 may indicate that the second data packet is not transmitted for the second bearer when the inactivity timer has expired. The receive processor 456 may also determine whether the PDCCH has indicated a downlink transmission. In an aspect, the second bearer may be for a second call, for example, a data session. The second bearer may have a quality of service (QoS) class indicator (QCI) greater than a QCI for the VoLTE call, which may have a value of 1. Additionally, the controller/processor 459 may determine whether a second data packet is scheduled for the first bearer (e.g., the VoLTE call). For example, the controller/processor 459 may determine whether the UE 104 has transmitted a scheduling request that has not received a grant, or whether the PDCCH indicates an incoming downlink data packet. In another aspect, the controller/processor 459 may determine whether a second data packet is transmitted based on a current configuration. For example, the controller/processor 459 may determine that a second data packet is communicated (e.g., transmitted and/or received) if the UE is configured for carrier aggregation, the UE is configured for MBMS service, the UE is configured for automatic retransmission of the first data packet using a different HARQ processor, or the UE is configured to transmit an SRS. In an aspect, the determination may be based on the current CDRX period. That is, the controller/processor 459 may determine whether the second data packet is communicated during the current CDRX period.

In block 708, the method 700 may include determining, based at least in part on the determination of whether the second data packet is communicated (e.g., transmitted and/ or received), whether to enter into an inactive mode in which at least the second channel is not decoded. In an aspect, for example, the controller/processor 459 may determine whether to enter into the inactive mode based at least in part on the determination of whether the second data packet is communicated for the first bearer or the second bearer. The determination may be in response to receiving the at least two acknowledgments. That is, the UE 104 may determine whether to enter into the inactive mode when the second acknowledgment for a HARQ process is received. The UE 104 may determine to enter into the inactive mode when the second data packet is not communicated (e.g., transmitted or received) for the second bearer. For example, the UE 104 may enter the inactive mode when the inactivity timer for the second bearer is expired. If the second data packet is communicated (e.g., transmitted or received) during the current CDRX period, the UE 104 may refrain from entering the inactive state. If the second data packet is communicated (e.g., transmitted or received) during a subsequent CDRX period, the UE 104 may enter the inactive state for the remainder of the CDRX period.

At block 710, the method 700 may optionally include entering the inactive mode in response to determining to enter the inactive mode based on the determination that the second data packet is not transmitted on the first bearer or the second bearer. In an aspect, for example, the receive processor 456 may enter into the inactive mode. For example, the receive processor 456 may temporarily stop decoding one or more channels. In an aspect, for example, the receive processor 456 may stop decoding the PHICH and the PDCCH.

At block 712, the method 700 may optionally include remaining in the inactive mode during a sub-frame when the second channel is scheduled to include an acknowledgment or negative acknowledgment for the HARQ process. In an aspect, for example, the receive processor 456 may remain in the inactive mode during the sub-frame when the second channel is scheduled to include an acknowledgment or negative acknowledgment for the HARQ process. For example, the sub-frame may be scheduled to include an ACK/NACK for the third or fourth retransmission of the first data packet. By remaining in the inactive mode, the receive processor 456 may skip decoding of the PHICH. The receive processor 456 may remain in the inactive mode until the next CDRX period. In an aspect, where semi-persistent scheduling is used (e.g., FIG. 6), the receive processor 456 may remain in the inactive mode until the next data packet for the first bearer is transmitted.

Figure 8:
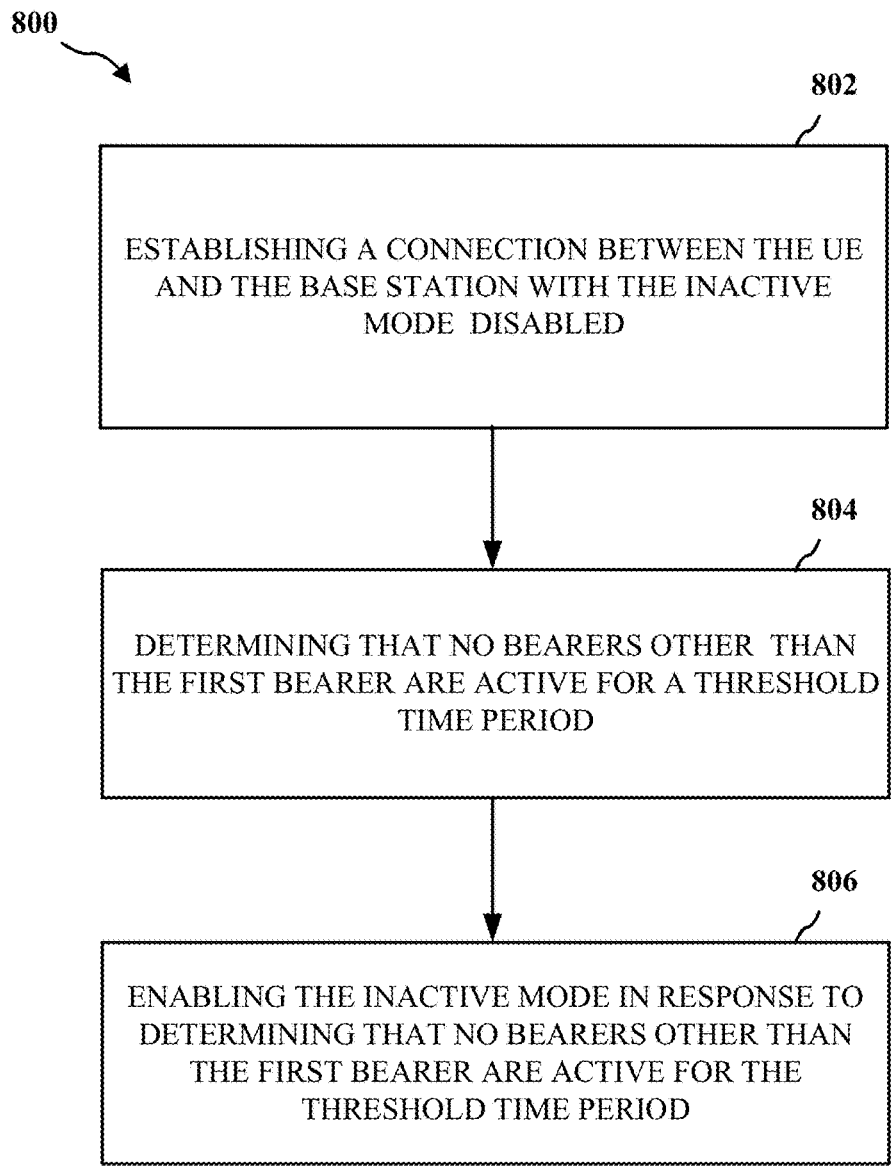
FIG. 8 is a flowchart of a method of wireless communication.

FIG. 8 is a flowchart of a method 800 of wireless communication. The method 800 may be performed by a UE (e.g., the UE 104, the UE 450, the apparatus 902/902').

At block 802, the method 800 may include establishing a connection between the UE and the base station with the inactive mode disabled. In an aspect, for example, the controller/processor 459 may establish the connection between the UE and the base station with the inactive mode disabled. For example, the controller/processor 459 may perform signaling to set up a VoLTE call and place the UE 104 in connected mode. The inactive mode may be disabled by default. Further, whenever the controller/processor 459 performs radio resource control (RCC) signaling or recovers the call, the inactive mode may be disabled.

At block 804, the method 800 may include determining that no bearers other than the first bearer are active for a threshold time period. In an aspect, for example, the controller/processor 459 may determine that no bearers other than the first bearer are active for a threshold time period.

For example, the controller/processor 459 may monitor any other bearers for activity at the PDCP layer using one or more inactivity timers to measure the threshold time period. The inactivity timer corresponding to a respective bearer may be reset whenever a data packet is transmitted or received for the respective bearer. The controller/processor 459 may determine that no bearers other than the first bearer are active for a threshold time period when all of the inactivity timers are expired.

At block 806, the method 800 may include enabling the inactive mode in response to the determining that no bearers other than the first bearer are active for the threshold time period. In an aspect, for example, the controller/processor 459 may enable the inactive mode in response to the determining that no bearers other than the first bearer are active for the threshold time period. In an aspect, the controller/processor 459 may communicate with the receive processor 456 via an application programming interface (API) to enable and disable the inactive mode. The receive processor 456 may only be able to enter the inactive mode when enabled by the controller/processor 459.

Figure 9:
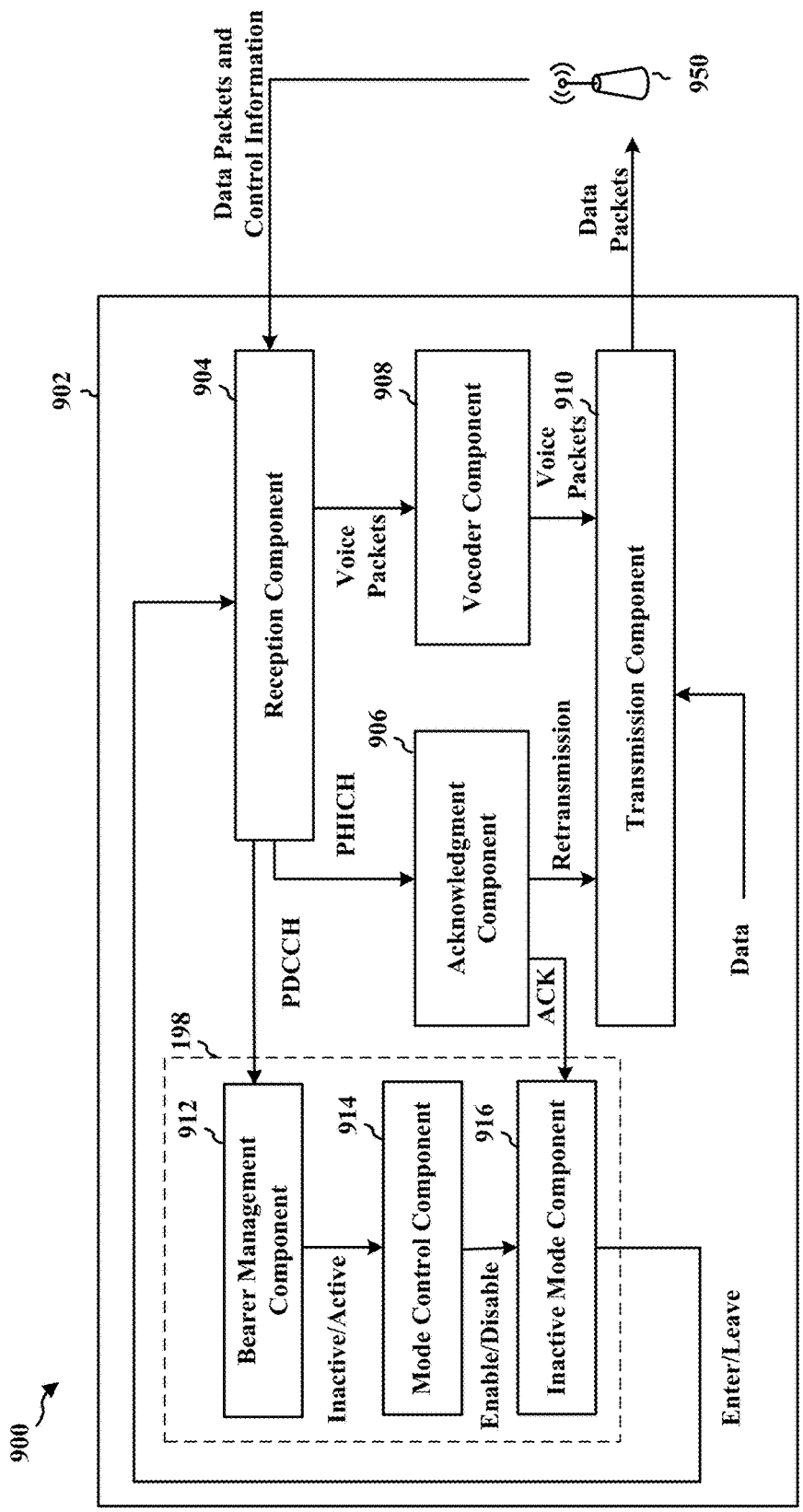
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus 902 may be a UE. The apparatus includes a reception component 904 that receives downlink transmissions, an acknowledgment component 906 that decodes the downlink channel to determine whether uplink transmissions were successful, a vocoder component 908 that processes voice packets, a transmission component 910 that data packets including voice packets, a bearer management component 912 that monitors activity on bearers, an mode control component 914 that enables or disables an active mode, and an inactive mode component 916 that places the reception component 904 into an inactive mode. In an aspect, the inactive mode controller 198 (FIG. 1) may be implemented by the bearer management component 912, the mode control component 914, and the inactive mode component 916.

The reception component 904 may include a receiver such as a radio frequency (RF) receiver. The reception component 904 may receive downlink transmissions including data packets and/or control information transmitted by a base station 950. The reception component 904 may decode various channels of the downlink transmission. In particular, the reception component 904 may decode the PHICH and provide the content to the acknowledgment component 906 and decode the PDCCH and provide the content to the bearer management component. The reception component 904 may be able to enter an inactive mode in which one or more channels are not decoded. The reception component may receive an enter/leave signal from the inactive mode component 916 indicating whether to enter or leave the inactive mode.

The acknowledgment component 906 may include hardware, firmware, and/or software code executable by a processor for processing an acknowledgment channel such as PHICH, the code comprising instructions and being stored in a memory (e.g., computer-readable medium). The acknowledgment component 906 may receive a decoded PHICH channel from the reception component 904. If the PHICH channel indicates NACK, the acknowledgment component 906 may indicate that the transmission component 910 should retransmit the corresponding data packet. If the PHICH channel indicates ACK, the acknowledgment component 906 may indicate to the inactive mode component that an acknowledgment was received. The acknowledgment component may wait until two acknowledgments have been received for a HARQ process before indicating that a transmitted data packet has been acknowledged.

The vocoder component 908 may include hardware for processing voice packets. The vocoder component 908 may also include a microphone for receiving audio and a speaker for generating audio. During a VoLTE call, the vocoder component 908 may generate voice packets and provide the voice packets to the transmission component 910. The vocoder component 908 may also receive voice packets from the reception component 904 and generate an audio output (e.g., the voice of the caller).

The transmission component 910 may include a transmitter such as an RF transmitter. In an aspect, the reception component 904 and the transmission component 910 may be implemented using a transceiver. The transmission component 910 may receive voice packets from the vocoder component 908 and transmit the voice packets to the base station 950 as data packets. The transmission component 910 may also receive data from other sources (e.g., higher layer applications) and transmit data packets carrying the data to the base station 950. Further, the transmission component 910 may receive a retransmission signal from the acknowledgment component 906 indicating that a previously transmitted data packet should be retransmitted. The transmission component 910 may retransmit the indicated data packet.

The bearer management component 912 may include hardware, firmware, and/or software code executable by a processor for determining whether a second data packet is transmitted for a second bearer, the code comprising instructions and being stored in a memory (e.g., computer-readable medium). The bearer management component 912 may receive a decoded control channel such as PDCCH providing information regarding transmissions (e.g., uplink or downlink grants). The bearer management component 912 may also receive downlink data from data channels (e.g., PDSCH) and receive data for transmission on uplink data channels (e.g., PUSCH). The bearer management component 912 may determine whether data packets are transmitted for each bearer based on the control information and/or data. In particular, the bearer management component 912 may determine whether bearers other than a bearer for a voice call (e.g., a VoLTE call) are active or inactive. The bearer management component 912 may send a signal to the mode control component 914 indicating whether the other bearers are active or inactive.

The mode control component 914 may include hardware, firmware, and/or software code executable by a processor for enabling the inactive mode in response to the determining that no bearers other than the first bearer are active for the threshold time period, the code comprising instructions and being stored in a memory (e.g., computer-readable medium). The mode control component 914 may receive the inactive/active signal from the bearer management component 912. Generally, the mode control component 914 may enable the inactive mode when the inactive signal is received and disable the inactive mode when the active signal is received. Further, the mode control component 914 may also receive configuration information indicating whether various transmission/reception features are configured and enable/disable the inactive mode based on the configuration information. For example, if the apparatus 902 is configured for carrier aggregation, channel state feedback, sounding reference signals, or TTI bundling, the mode control component 914 may disable the inactive mode. As another example, if the apparatus 902 is not configured for CDRX, the inactive mode control component may disable the inactive mode.

The inactive mode component 916 may include hardware, firmware, and/or software code executable by a processor for determining, based at least in part on the determination of whether the second data packet is transmitted for the second bearer to the UE, whether to enter into the inactive mode, the code comprising instructions and being stored in a memory (e.g., computer-readable medium). The inactive mode component 916 may receive the enable/disable signal from the mode control component 914. The inactive mode component 916 may also receive acknowledgments from the acknowledgment component 906. The inactive mode component 916 may generate an enter/leave signal indicating whether the reception component 904 should enter or leave the inactive mode. For example, the inactive mode component 916 may generate the enter signal when the inactive mode is enabled, the first bearer (e.g., the VoLTE call) is the only active bearer, and the acknowledgment component 906 indicates that two acknowledgments (e.g., positive acknowledgements such as ACKs) have been received for the active HARQ process for the first bearer. The inactive mode component 916 may generate a leave signal when a new CDRX period is beginning for transmitting the next voice packet. The inactive mode component 916 may also generate the leave signal when the inactive mode is disabled (e.g., when there is data to transmit/receive on another bearer).

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
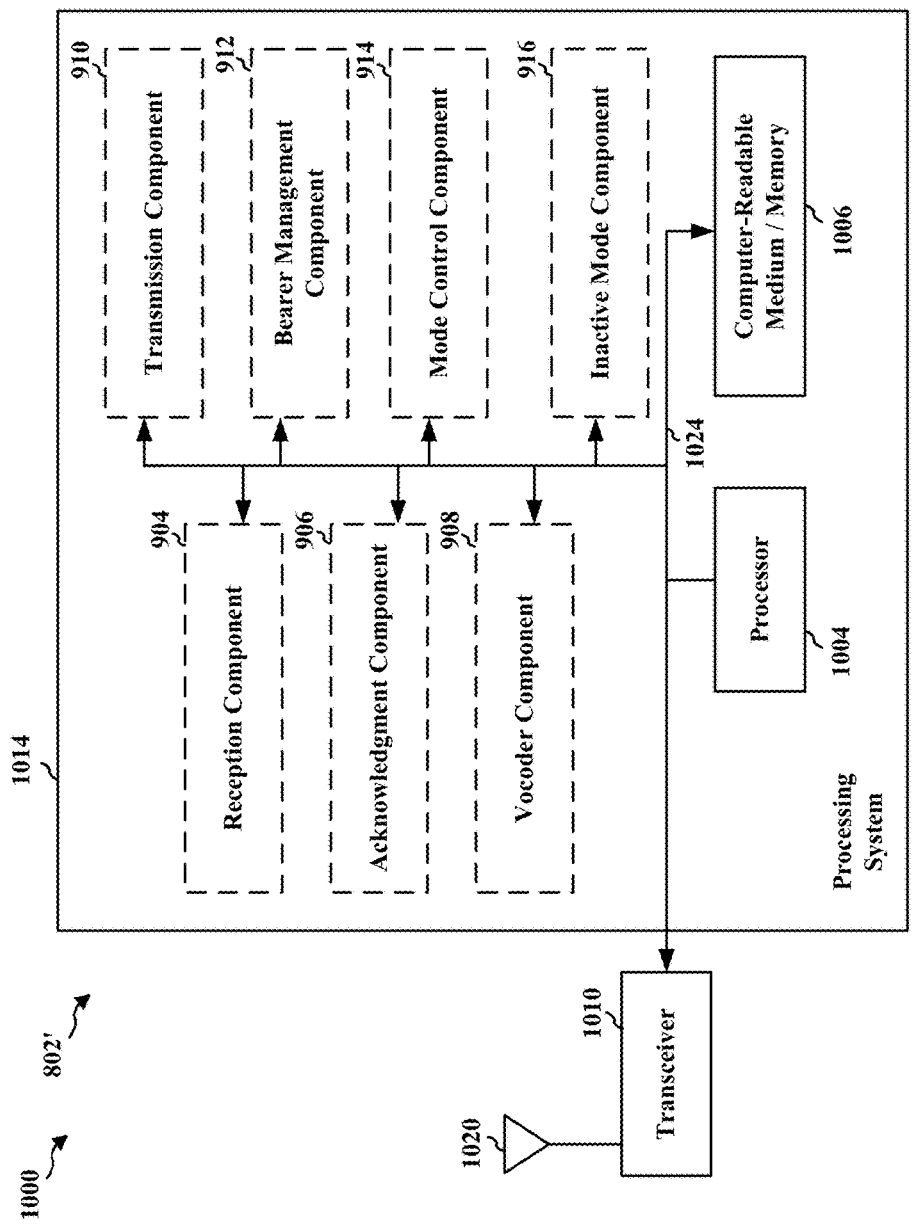
FIG. 10 is a diagram illustrating an example of a hardware implementation for an apparatus employing a processing system.

FIG. 10 is a diagram 1000 illustrating an example of a hardware implementation for an apparatus 1002' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, and 916 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, and 916. The components may be software components running in the processor 1004, resident/stored in the computer readable medium/memory 1006, one or more hardware components coupled to the processor 1004, or some combination thereof. The processing system 1014 may be a component of the UE 450 and may include the memory 460 and/or at least one of the TX processor 468, the RX processor 456, and the controller/processor 459.

In one configuration, the apparatus 902/902' for wireless communication includes means for means for transmitting a first data packet for a first bearer using a HARQ process to a base station on a first channel; means for receiving at least two acknowledgments, for the HARQ process on a second channel different than the first channel indicating that the first data packet was successfully received by the base station; and means for determining, based at least in part on the determination of whether the second data packet is transmitted for the second bearer to the UE, whether to enter into an inactive mode in which no data packets are decoded at least the second channel is not decoded. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

Figure 11:
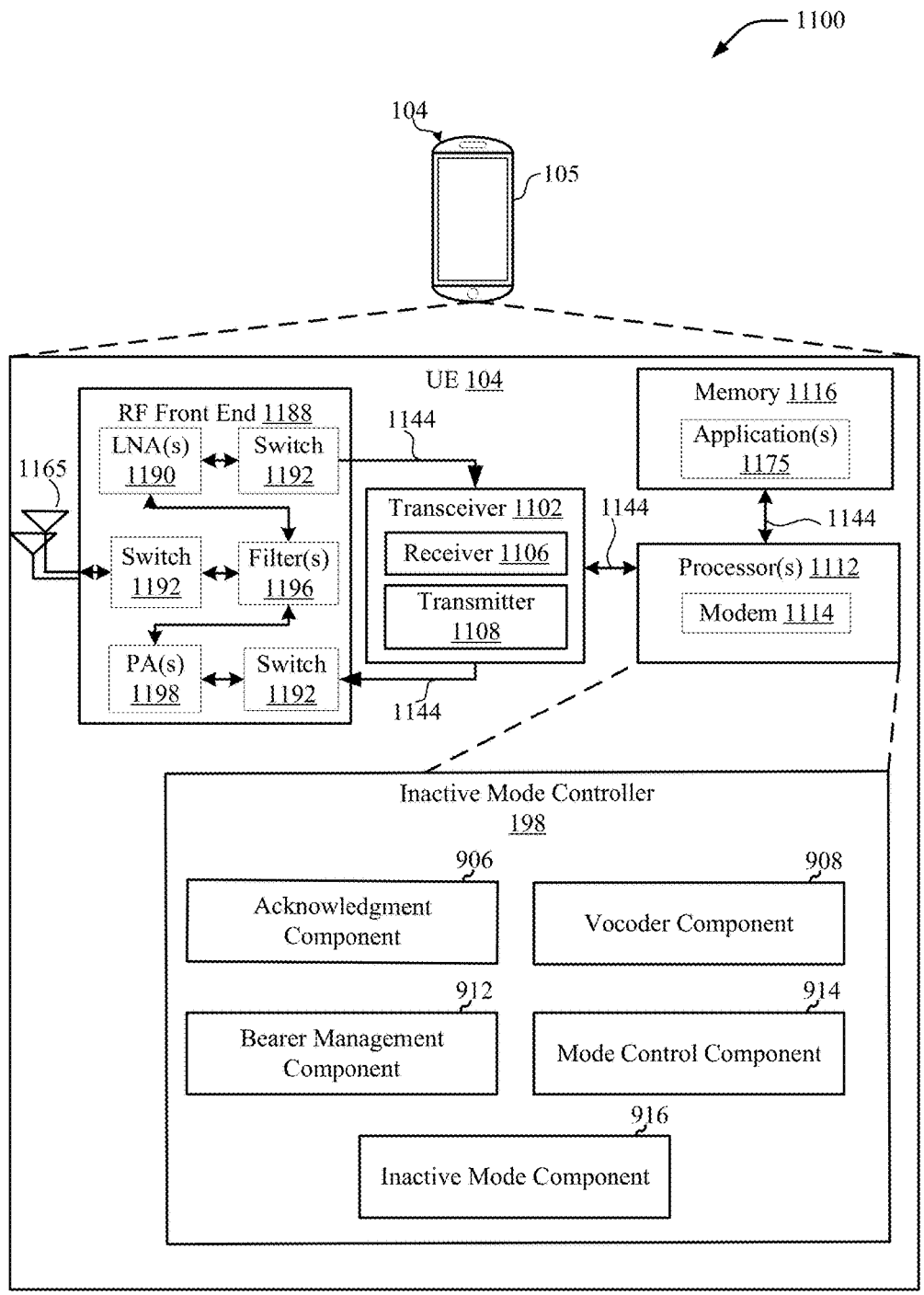
FIG. 11 is a diagram illustrating an example of a hardware implementation for a UE.

FIG. 11 schematically illustrates hardware components and subcomponents of the UE 104 for implementing one or more methods (e.g., methods 700 and 800) described herein in accordance with various aspects of the present disclosure. In aspects, the UE may include a housing 105 including one or more of the hardware components and subcomponents. For example, one example of an implementation of UE 104 may include a variety of components, some of which have already been described above, but including components such as one or more processors 1112 and memory 1116 and transceiver 1102 in communication via one or more buses 1144, which may operate in conjunction with the inactive mode controller 198 to enable one or more of the functions described herein related to including one or more methods of the present disclosure. Further, the one or more processors 1112, modem 1114, memory 1116, transceiver 1102, RF front end 1188 and one or more antennas 1165, may be configured to support voice and/or data calls (simultaneously or non-simultaneously) in one or more radio access technologies.

In an aspect, the one or more processors 1112 can include a modem 1114 that uses one or more modem processors. The various functions related to inactive mode controller 198 may be included in modem 1114 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1114 associated with inactive mode controller 198 may be performed by transceiver 1102.

Also, memory 1116 may be configured to store data used herein and/or local versions of applications or inactive mode controller 198 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining inactive mode controller 198 and/or one or more of its subcomponents, and/or data associated therewith, when UE 104 is operating at least one processor 1112 to execute inactive mode controller 198 and/or one or more of its subcomponents.

Transceiver 1102 may include at least one receiver 1106 and at least one transmitter 1108. Receiver 1106 may include hardware, firmware, and/or software code executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one eNB 102. Additionally, receiver 1106 may process such received signals, and also may obtain measurements of the signals, such as, but not limited to, Ec/Io, SNR, RSRP, RS SI, etc. Transmitter 1108 may include hardware, firmware, and/or software code executable by a processor for transmitting data, the code comprising instructions and being stored in a memory (e.g., computer-readable medium). A suitable example of transmitter 1108 may including, but is not limited to, an RF transmitter.

Moreover, in an aspect, UE 104 may include RF front end 1188, which may operate in communication with one or more antennas 1165 and transceiver 1102 for receiving and transmitting radio transmissions, for example, wireless communications transmitted by at least one eNB 102 or wireless transmissions transmitted by UE 104. RF front end 588 may be connected to one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 590 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 can be used by RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver may be tuned to operate at specified frequencies such that UE 104 can communicate with, for example, one or more eNBs 102 or one or more cells associated with one or more eNBs 102. In an aspect, for example, modem 1114 can configure transceiver 1102 to operate at a specified frequency and power level based on the UE configuration of the UE 104 and the communication protocol used by modem 1114.

In an aspect, modem 1114 can be a multiband-multimode modem, which can process digital data and communicate with transceiver 1102 such that the digital data is sent and received using transceiver 1102. In an aspect, modem 1114 can be multiband and be configured to support multiple frequency bands for a specific communications protocol. In an aspect, modem 1114 can be multimode and be configured to support multiple operating networks and communications protocols. In an aspect, modem 1114 can control one or more components of UE 104 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications by a user equipment (UE), comprising:
    transmitting a first data packet for a first bearer using a Hybrid Automatic Repeat request (HARQ) process to a base station on a first channel;
    receiving at least two acknowledgments, for the HARQ process on a second channel different than the first channel indicating that the first data packet was successfully received by the base station;
    determining whether a second data packet is communicated for the first bearer or a second bearer; and
    determining, based at least in part on the determination of whether the second data packet is communicated, whether to enter into an inactive mode in which at least the second channel is not decoded.

2. The method of claim 1, wherein the determining whether to enter the inactive mode includes determining to enter the inactive mode further based on when the second bearer has been inactive for a threshold time period.

3. The method of claim 2, wherein the second bearer has a quality of service (QoS) indicator greater than a QoS indicator for the first bearer.

4. The method of claim 2, wherein the threshold time period is a multiple of a connected mode discontinuous reception (CDRX) period.

5. The method of claim 2, wherein determining whether the second data packet is communicated for the second bearer includes:
    monitoring activity of the second bearer at a packet data convergence protocol (PDCP) layer; and
    indicating to a lower layer that the second bearer has been inactive for the threshold time period for the lower layer to enable the inactive mode.

6. The method of claim 2, wherein determining to enter the inactive mode is further based on the UE being configured for connected mode discontinuous reception (CDRX) with a periodicity corresponding to a periodicity of a call on the first bearer.

7. The method of claim 2, wherein determining to enter the inactive mode is further based on determining that the UE is not using carrier aggregation for the second bearer.

8. The method of claim 1, further comprising:
establishing a connection between the UE and the base station with the inactive mode disabled;
determining that no bearers other than the first bearer are active for a threshold time period; and
enabling the inactive mode in response to the determining that no bearers other than the first bearer are active for the threshold time period.

9. The method of claim 1, wherein the second data packet is one of a transmission of channel state information, a transmission of a sounding reference signal, an automatic retransmission of the first data packet using a different HARQ process, a buffer status report, or a multimedia broadcast multicast service (MBMS) transmission, and wherein the determining whether to enter the inactive mode includes determining not to enter the inactive mode when the UE is configured to transmit or receive the second data packet.

10. The method of claim 1, wherein receiving the at least two acknowledgments for the HARQ process includes receiving a first acknowledgment for the HARQ process for the first data packet and receiving a second acknowledgment for the HARQ process for a retransmission of the first data packet.

11. The method of claim 10, wherein the determining whether to enter into the inactive mode is in response to receiving the second acknowledgment.

12. The method of claim 1, wherein the second data packet is a scheduling request transmitted by the UE for the first bearer, and wherein the determining whether to enter the inactive mode includes determining not to enter the inactive mode for a time period after transmitting the scheduling request and before receiving a grant in response to the scheduling request.

13. The method of claim 1, wherein the first bearer carries a voice over long term evolution (VoLTE) call.

14. The method of claim 1, further comprising:
entering into the inactive mode in response to determining to enter into the inactive mode based on the deteimination that the second data packet is not transmitted on the second bearer; and
remaining in the inactive mode during a sub-frame when the second channel is scheduled to include an acknowledgment or negative acknowledgment for the HARQ process.

15. The method of claim 14, wherein the second channel is scheduled to include a third acknowledgment and a fourth acknowledgment for the HARQ process while the UE remains in the inactive mode.

16. A user equipment (UE) for wireless communications, comprising:
a transceiver;
a memory; and
a processor communicatively coupled to the transceiver and the memory, wherein the processor is configured to:
transmit a first data packet for a first bearer using a Hybrid Automatic Repeat request (HARQ) process to a base station on a first channel;
receive at least two acknowledgments, for the HARQ process on a second channel different than the first channel indicating that the first data packet was successfully received by the base station;
determine whether a second data packet is communicated for the first bearer or a second bearer; and
determine, based at least in part on the determination of whether the second data packet is communicated, whether to enter into an inactive mode in which at least the second channel is not decoded.

17. The UE of claim 16, wherein the processor is configured to determine whether to enter the inactive mode based at least in part on determining to enter the inactive mode further based on when the second bearer has been inactive for a threshold time period.

18. The UE of claim 17, wherein the second bearer has a quality of service (QoS) indicator greater than a QoS indicator for the first bearer.

19. The UE of claim 17, further comprising a housing including the transceiver, the memory and the processor.

20. The UE of claim 17, wherein the processor is further configured to:
monitor activity of the second bearer at a packet data convergence protocol (PDCP) layer; and
indicate to a lower layer that the second bearer has been inactive for the threshold time period for the lower layer to enable the inactive mode.

21. The UE of claim 17, wherein the processor is configured to determine to enter the inactive mode further based on the UE being configured for connected mode discontinuous reception (CDRX) with a periodicity corresponding to a periodicity of a call on the first bearer.

22. The UE of claim 17, wherein the processor is configured to determine to enter the inactive mode further based on determining that the UE is not using carrier aggregation for the second bearer.

23. The UE of claim 16, wherein the processor is configured to:
establish a connection between the UE and the base station with the inactive mode disabled;
determine that no bearers other than the first bearer are active for a threshold time period; and
enable the inactive mode in response to the determining that no bearers other than the first bearer are active for the threshold time period.

24. The UE of claim 16, wherein the second data packet is one of a transmission of channel state information, a transmission of a sounding reference signal, an automatic retransmission of the first data packet using a different HARQ process, a buffer status report, or a multimedia broadcast multicast service (MBMS) transmission, and wherein the processor is configured to determine not to enter the inactive mode when the UE is configured to transmit or receive the second data packet.

25. The UE of claim 16, wherein the processor is configured to receive a first acknowledgment for the HARQ process for the first data packet and receive a second acknowledgement for the HARQ process for a retransmission of the first data packet.

26. The UE of claim 25, wherein the processor is configured to determine whether to enter into the inactive mode in response to receiving the second acknowledgment.

27. The UE of claim 16, wherein the second data packet is a scheduling request transmitted by the UE, and wherein the processor is configured to determine whether to enter the inactive mode based at least in part on determining not to enter the inactive mode for a time period after transmitting the scheduling request and before receiving a grant in response to the scheduling request.

28. The UE of claim 16, wherein the first bearer carries a voice over long term evolution (VoLTE) call.

29. A user equipment (UE) for wireless communications, comprising:

means for transmitting a first data packet for a first bearer using a Hybrid Automatic Repeat request (HARQ) process to a base station on a first channel;

means for receiving at least two acknowledgments, for the HARQ process on a second channel different than the first channel indicating that the first data packet was successfully received by the base station;

means for determining whether a second data packet is communicated for the first bearer or a second bearer; and means for determining, based at least in part on the determination of whether the second data packet is communicated, whether to enter into an inactive mode in which at least the second channel is not decoded.

30. A non-transitory computer readable medium storing computer executable code, comprising code to:

transmit a first data packet for a first bearer using a Hybrid Automatic Repeat request (HARQ) process to a base station on a first channel;

receive at least two acknowledgments, for the HARQ process on a second channel different than the first channel indicating that the first data packet was successfully received by the base station;

determine whether a second data packet is communicated for the first bearer or a second bearer; and determine, based at least in part on the determination of whether the second data packet is communicated, whether to enter into an inactive mode in which at least the second channel is not decoded.

* * * * *